(12) United States Patent
Mellet et al.

(10) Patent No.: US 8,534,150 B2
(45) Date of Patent: Sep. 17, 2013

(54) DUAL CLUTCH MULTI-SPEED TRANSMISSION

(75) Inventors: Edward W. Mellet, Rochester Hills, MI (US); Scott H. Wittkopp, Ypsilanti, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 13/095,611

(22) Filed: Apr. 27, 2011

(65) Prior Publication Data
US 2012/0272761 A1 Nov. 1, 2012

(51) Int. Cl.
*F16H 3/08* (2006.01)
*F16H 3/38* (2006.01)

(52) U.S. Cl.
USPC ............................................. 74/331

(58) Field of Classification Search
USPC .............................. 74/330, 331, 340, 325, 339
See application file for complete search history.

(56) References Cited

U.S. PATENT DOCUMENTS

| | | | | |
|---|---|---|---|---|
| 7,080,566 B2* | 7/2006 | Baldwin et al. | | 74/331 |
| 7,437,963 B2* | 10/2008 | Haka et al. | | 74/329 |
| 7,470,206 B2 | 12/2008 | Rodgers, II | | |
| 7,621,195 B2* | 11/2009 | Hattori | | 74/331 |
| 8,424,404 B2* | 4/2013 | Ross et al. | | 74/240 |
| 2007/0113696 A1* | 5/2007 | Haka et al. | | 74/340 |
| 2007/0131046 A1 | 6/2007 | Borgerson | | |
| 2008/0098838 A1* | 5/2008 | Seo | | 74/340 |
| 2009/0173175 A1* | 7/2009 | Thery | | 74/331 |
| 2010/0257962 A1* | 10/2010 | Recker et al. | | 74/331 |
| 2012/0260756 A1* | 10/2012 | Mellet et al. | | 74/331 |

FOREIGN PATENT DOCUMENTS

DE 102006039687 3/2008
WO WO2006084555 A1 8/2006

* cited by examiner

*Primary Examiner* — Ha D Ho
*Assistant Examiner* — Jude Agendia

(57) ABSTRACT

A transmission includes an input member, an output member, first and second transmission input shafts, first and second countershafts, a plurality of co-planar gear sets and a plurality of torque transmitting devices. The torque transmitting devices include a plurality of synchronizer assemblies and a dual clutch assembly. The transmission is operable to provide at least one reverse speed ratio and eight forward speed ratios between the input member and the output member.

17 Claims, 1 Drawing Sheet

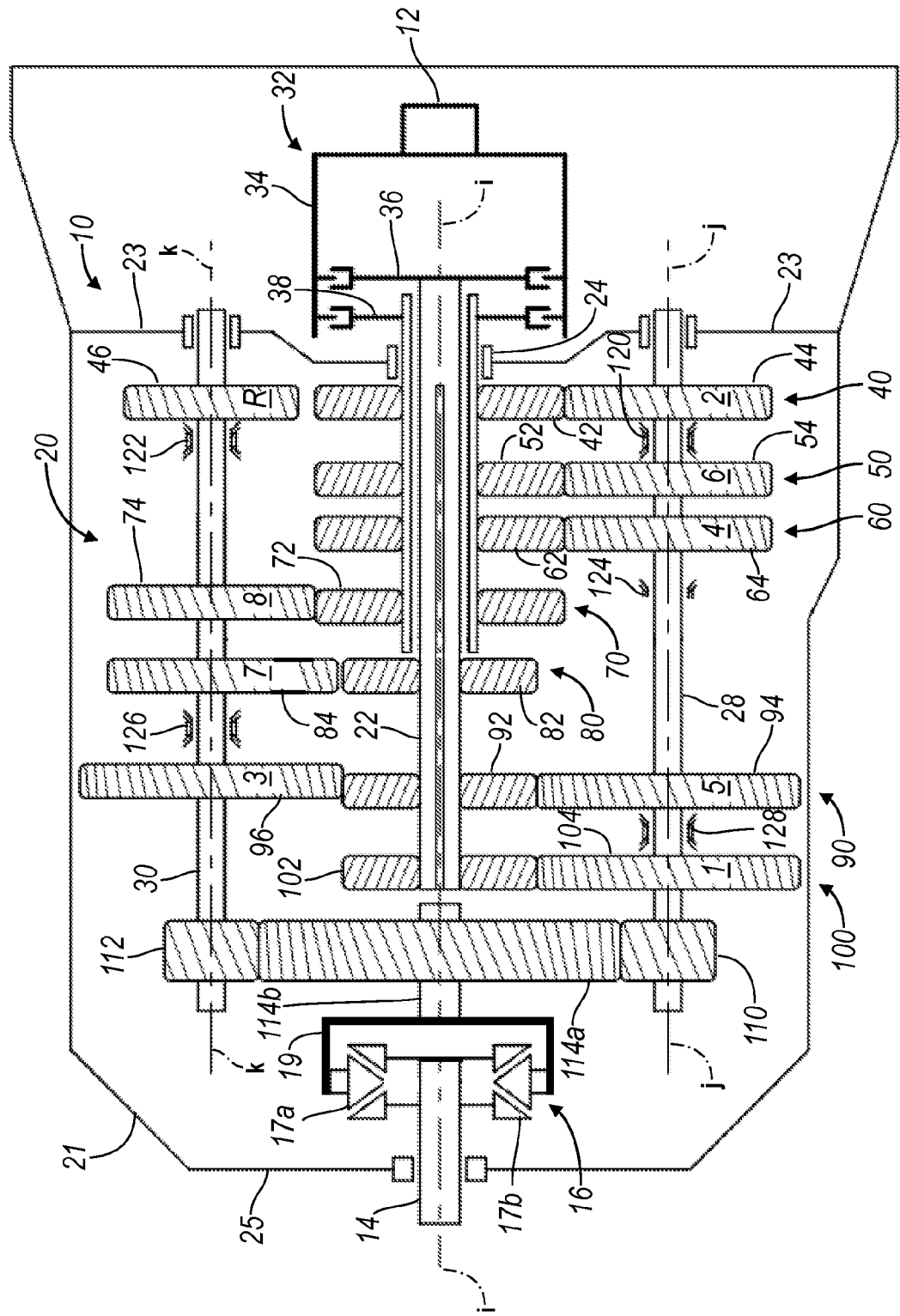

US 8,534,150 B2

DUAL CLUTCH MULTI-SPEED TRANSMISSION

TECHNICAL FIELD

The present disclosure relates to transmissions and more particularly to a compact, dual clutch transmission having three axes of rotation to establish at least nine gear speeds including reverse.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having a transmission housing, a dual clutch, a first, second, third, fourth, fifth, sixth, and seventh gear sets, a first and second transmission input shafts or members, a first and second countershafts, a first and second transfer gears, an output gear, and five synchronizer assemblies.

In another embodiment of the present invention, the dual clutch assembly has a clutch housing connectable to a flywheel of an engine. The clutch housing is rotationally supported within the transmission housing.

In still another embodiment of the present invention, the first, second, third, fourth, fifth, sixth, and seventh gear sets each include a first gear in mesh with a second gear. Further, the first gear set includes a third gear in mesh with the second gear and the sixth gear set includes a third gear in mesh with the first gear.

In still another embodiment of the present invention, the first transmission input shaft is rotatably supported in the transmission housing. The first gears of the fifth, sixth and seventh gear sets are rotatably fixed for common rotation with the first transmission input shaft.

In still another embodiment of the present invention, the second transmission input shaft member is rotatably supported in the transmission housing. The first gears of the first, second, third, and fourth gear sets are rotatably fixed for common rotation with the second transmission input shaft and the second transmission input shaft member is concentric with the first transmission input shaft and at least partially surrounds the first transmission input shaft.

In still another embodiment of the present invention, the first countershaft is rotatably supported within the transmission housing and spaced apart from and parallel with the first and second transmission input shaft members. Each of the second gears of the first, second, third, sixth and seventh gear sets are selectively connectable for common rotation with the first countershaft.

In still another embodiment of the present invention, the first transfer gear is fixedly connected for common rotation with the first countershaft.

In still another embodiment of the present invention, the second countershaft is rotatably supported within the transmission housing and spaced apart from and parallel with the first and second transmission input shaft members. Each of the second gears of the fourth and fifth gear sets and the third gears of the first and sixth gear sets are selectively connectable for common rotation with the second countershaft.

In still another embodiment of the present invention, the second transfer gear fixedly connected for common rotation with the second countershaft.

In still another embodiment of the present invention, the output gear support for rotation in the transmission housing wherein the first and second transfer gears each independently mesh with the output gear.

In still another embodiment of the present invention, the five synchronizer assemblies each selectively couple at least one of the gears of the first, second, third, fourth, fifth, sixth and seventh gear sets with at least one of the first countershaft and the second countershaft.

In still another embodiment of the present invention, the selective engagement of the dual clutch assembly interconnects the dual clutch housing with at least one of the first and the second transmission input shafts and the selective engagement of at least one of the five synchronizer assemblies transfers torque from at least one of the first and the second transmission input shafts to the output gear through at least one of the first and second transfer gears to achieve at least one of eight forward speed ratios and at least one reverse speed ratio.

In still another embodiment of the present invention, a first of the five synchronizer assemblies selectively connects the second gear of the first gear set to the first countershaft and the second gear of the second gear set to the first countershaft.

In still another embodiment of the present invention, a second of the five synchronizer assemblies selectively connects the third gear of the first gear set to the second countershaft and the second gear of the fourth gear set to the second countershaft.

In still another embodiment of the present invention, a third of the five synchronizer assemblies selectively connects the second gear of the third gear set to the first countershaft.

In still another embodiment of the present invention, a fourth of the five synchronizer assemblies selectively connects the second gear of the fifth gear set to the second countershaft and the third gear of the sixth gear set to the second countershaft.

In still another embodiment of the present invention, a fifth of the five synchronizer assemblies selectively connects the second gear of the sixth gear set to the first countershaft and the second gear of the seventh gear set to the first countershaft.

In still another embodiment of the present invention, the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, and the seventh gear set is disposed between an end wall of the transmission housing and the sixth gear set.

In still another embodiment of the present invention, the first gear set provides a second forward speed ratio and a reverse speed ratio, the second gear set provides a sixth forward speed ratio, the third gear set provides a fourth speed ratio, the fourth gear set provides an eighth forward speed ratio, the fifth gear set provides a seventh forward speed ratio, the sixth gear set provides a third and a fifth forward speed ratios, and the seventh gear set provides a first forward speed ratio.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 1 is a schematic diagram of an embodiment of an eight speed transmission, in accordance with the present invention.

DESCRIPTION

Referring to FIG. 1, a multiple speed transmission is generally indicated by reference number 10. The transmission 10 includes an input shaft member 12, an output member 14 and a gearing arrangement 20. The input shaft member 12 may be separate from the transmission 10 and form part of or be connected with a flywheel or other output from an engine (not shown). The output member 14 is rotatably driven by a final drive assembly 16. More specifically, the final drive assembly 16 includes a first differential gear set 17a coupled to and supported in a differential housing 19. The first differential gear set 17a intermeshes with a second differential gear set 17b supported for common rotation on output member 14.

The transmission 10 includes a housing 21 that at least partially encloses the gearing arrangement 20. The housing 21 includes end walls 23 and 25. End wall 23 is located on a front or engine side of the transmission 10 proximate the dual clutch assembly 32 and end wall 25 is located on an opposite side of the transmission proximate the differential or final drive assembly. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 28 and a second countershaft 30. The second transmission input shaft or member 24 is a sleeve shaft that is concentric with and overlies the first transmission input shaft or member 22. The first and second countershafts 28, 30 are spaced apart from and parallel with the first and second transmission input shaft members 22, 24. Moreover, the first and second countershafts 28, 30 are connectable through additional gears and/or shafts (not shown) to a final drive assembly (not shown) that is configured to drive a pair of road wheels (not shown). The first and second transmission input shafts 22, 24 and the output shaft 14 define a first axis of rotation i, the first countershaft 28 defines a second axis of rotation j and the second countershaft 30 defines a third axis of rotation k.

A dual clutch assembly 32 is connectable between the input shaft member 12 and the first and second transmission input shaft members 22, 24. The dual clutch assembly 32 includes a clutch housing 34 connectable for common rotation with the input shaft member 12. The dual clutch assembly 32 could be either a dry or a wet clutch assembly. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon, or are otherwise coupled thereto, that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input shaft member 12 for common rotation with the first transmission input shaft member 22. Selective engagement of clutch element 38 with the clutch housing 34 connects the input shaft member 12 for common rotation with the second transmission input shaft member 24.

The gearing arrangement 20 also includes a plurality of co-planar, intermeshing gear sets 40, 50, 60, 70, 80, 90, and 100. Co-planar gear sets 50, 60, 70, 80, and 100 include intermeshing gear pairs: gear 52 and gear 54, gear 62 and gear 64, gear 72 and gear 74, gear 82 and gear 84, and gear 102 and gear 104, respectively. Co-planar gear sets 40 and 90 include three intermeshing gears each, respectively: gear 42 intermeshes with gears 44 and gear 44 intermeshes with gear 46 and gear 92 intermeshes with gears 94 and 96. In an embodiment of the present invention, gears 42, 52, 62 and 72 are attached to and rotatably fixed for common rotation with the second transmission input shaft member 24. Gears 82, 92 and 102 are attached to and rotatably fixed for common rotation with the first transmission input shaft member 22. In contrast, gears 46, 74, 84, and 96 are selectively connectable for common rotation with the second countershaft 30. Further, gears 44, 54, 64, 94 and 104 are selectively connectable for common rotation with the first countershaft 28.

More specifically, Co-planar gear set 40 includes gear 42, gear 44 and gear 46. Gear 42 is rotatably fixed and connected for common rotation with the second transmission input shaft 24 and intermeshes with gear 44. Gear 44 is selectively connectable for common rotation with the first countershaft member 28. Gear 46 is selectively connectable for common rotation with the second countershaft 30. Gear 46 intermeshes with gear 44. Gear set 40 is disposed adjacent the end wall 23.

Co-planar gear set 50 includes gear 52 and gear 54. Gear 52 is rotatably fixed and connected for common rotation with the second transmission input shaft member 24 and intermeshes with gear 54. Gear 54 is selectively connectable for common rotation with the first countershaft 28. Gear set 50 is positioned adjacent gear set 40.

Co-planar gear set 60 includes gear 62 and gear 64. Gear 62 is rotatably fixed and connected for common rotation with the second transmission input shaft member 24 and intermeshes with gear 64. Gear 64 is selectively connectable for common rotation with the first countershaft 28. Gear set 60 is disposed adjacent gear set 50.

Co-planar gear set 70 includes gear 72 and gear 74. Gear 72 is rotatably fixed and connected for common rotation with the second transmission input shaft member 24 and intermeshes with gear 74. Gear 74 is selectively connectable for common rotation with the second countershaft member 30. Gear set 70 is located adjacent gear set 60.

Co-planar gear set 80 includes gear 82 and gear 84. Gear 82 is rotatably fixed and connected for common rotation with the first transmission input shaft member 22 and intermeshes with gear 84. Gear 84 is selectively connectable for common rotation with the second countershaft 30. Gear set 80 is located adjacent gear set 70.

Co-planar gear set 90 includes gear 92, gear 94 and gear 96. Gear 92 is rotatably fixed and connected for common rotation with the first transmission input shaft member 22 and intermeshes with gear 94 and gear 96. Gear 94 is selectively connectable for common rotation with the first countershaft 28. Gear 96 is selectively connectable for common rotation with the second countershaft 30. Gear set 90 is positioned adjacent gear set 80.

Co-planar gear set 100 includes gear 102 and gear 104. Gear 102 is rotatably fixed and connected for common rotation with the first transmission input shaft member 22 and intermeshes with gear 104. Gear 104 is selectively connectable for common rotation with the first countershaft 28. Gear set 100 is disposed between gear set 90 and the end wall 25.

Further, a first countershaft transfer gear 110 is rotatably fixed and connected for common rotation with the first countershaft 28. A second countershaft transfer gear 112 is rotatably fixed and connected for common rotation with the second countershaft 30. First countershaft transfer gear 110 and the second countershaft transfer gear 112 are each configured to mesh with an output transfer gear 114a. However, the first countershaft transfer gear 110 and the second countershaft transfer gear 112 do not mesh with each other. The first countershaft transfer gear 110 is disposed between gear 104 and end wall 25. The second countershaft transfer gear 112 is disposed between gear 96 and end wall 25. The output transfer member 114a is co-planar with first and second countershaft transfer gears 110, 112 and positioned between the gear set 100 and end wall 25. The output transfer member 114a is attached for common rotation with a transfer shaft 114b. Shaft 114b is connected to and rotatably drives differential housing 19.

The transmission 10 further includes a plurality of selectively actuatable synchronizer assemblies 120, 122, 124, 126 and 128. Synchronizer 124 is a single sided synchronizer that generally includes a shift fork (not shown) that is bi-directionally translated by an actuator (not shown) into either an engaged position or a neutral or disengaged position. In the present embodiment, synchronizer 124 is selectively actuatable to connect gear 64 for common rotation with the first countershaft 28. Synchronizers 120, 122, 126, and 128 are double sided synchronizers each of which generally include a shift fork (not shown) that is bi-directionally translated by an actuator (not shown) into at least two engaged positions and a neutral or disengaged position. In the present embodiment, synchronizer 120 is selectively actuatable to connect for common rotation gear 44 with the first countershaft 28 and is selectively actuatable to connect for common rotation gear 54 with the first countershaft 28. Synchronizer 122 is selectively actuatable to connect for common rotation gear 46 with the second countershaft 30 and is selectively actuatable to connect for common rotation gear 74 with the second countershaft 30. Synchronizer 126 is selectively actuatable to connect for common rotation gear 84 with the second countershaft 30 and is selectively actuatable to connect for common rotation gear 96 with the second countershaft 30. Synchronizer 128 is selectively actuatable to connect for common rotation gear 94 with the first countershaft 28 and is selectively actuatable to connect for common rotation gear 104 with the first countershaft 28.

The transmission 10 is capable of transmitting torque from the input shaft member 12 to the output member 14 in at least eight forward torque ratios and at least one reverse torque ratio. Each of the forward torque ratios and the reverse torque ratio is attained by selective engagement of the dual clutch assembly 32 and one or more of the synchronizer assemblies. Those skilled in the art will readily understand that a different speed ratio is associated with each torque ratio.

It should be appreciated that each individual gear set 40, 50, 60, 70, 80, 90 and 100 provides one or more forward and/or reverse gear ratios upon selective engagement of the synchronizer assemblies. However, which synchronizer and which gear set are associated with a particular forward or reverse speed ratio may vary without departing from the scope of the present invention.

For example, to establish the reverse torque ratio, clutch element 38 is engaged to couple the input shaft member 12 with the second transmission input shaft 24 and synchronizer 122 is engaged to connect gear 46 to the second countershaft 30. More specifically, input torque from the input shaft member 12 is transferred through the dual clutch assembly 32 to the second transmission input shaft 24, through gear 42 to gear 44, through gear 44 to gear 46, from gear 46 to synchronizer 122, from synchronizer 122 to second countershaft 30, from second countershaft 30 to transfer gear 112, from transfer gear 112 to output transfer gear 114a and from output transfer gear 114a to differential housing 19 through transfer shaft 114b.

To establish a first forward torque ratio (i.e. a 1st gear), clutch element 36 is engaged to couple the input shaft member 12 with the first transmission input shaft member 22 and synchronizer 128 is activated to couple gear 104 to the first countershaft 28. More specifically, input torque from the input shaft member 12 is transferred through the dual clutch assembly 32 to the first transmission input shaft member 22 to gear 102. Gear 102 transfers torque to gear 104 which transfers the torque to the first countershaft 28 through synchronizer 128, from the first countershaft 28 to transfer gear 110, from transfer gear 110 to output transfer gear 114a and from output transfer gear 114a to differential housing 19 through transfer shaft 114b.

To establish a second forward torque ratio (i.e. a 2nd gear), clutch element 38 is engaged to couple the input shaft member 12 to the second transmission input shaft 24 which rotates gear 42 and synchronizer 120 is activated to couple gear 44 to the first countershaft member 28. Accordingly, input torque from the input shaft member 12 is transferred through the dual clutch assembly 32 to the second transmission input shaft member 24 to gear 42. Gear 42 transfers torque to gear 44 which transfers the torque to the first countershaft 28 through synchronizer 120, from the first countershaft 28 to transfer gear 110, from transfer gear 110 to output transfer gear 114a and from output transfer gear 114a to differential housing 19 through transfer shaft 114b.

To establish a third forward torque ratio (i.e. a 3rd gear), clutch element 36 is engaged to couple the input shaft member 12 to the first transmission input shaft 22 which rotates gear 96 and synchronizer 126 is engaged to couple gear 96 to the second countershaft 30. Accordingly, input torque from the input shaft member 12 is transferred through the dual clutch assembly 32 to the first transmission input shaft member 22 to gear 92. Gear 92 transfers torque to gear 96 which transfers the torque to the second countershaft 30 through synchronizer 126, from the second countershaft 30 to transfer gear 112, from transfer gear 112 to output transfer gear 114a and from output transfer gear 114a to differential housing 19 through transfer shaft 114b.

To establish a fourth forward torque ratio (i.e. a 4th gear), clutch element 38 is engaged to couple the input shaft member 12 to the second transmission input shaft member 24 which rotates gear 62 and synchronizer 124 is activated to couple gear 64 to the first countershaft 28. Thus, input torque from the input shaft member 12 is transferred through the dual clutch assembly 32 to the second transmission input shaft 24 to gear 62. Gear 62 transfers torque to gear 64 which transfers the torque to the first countershaft 28 through synchronizer 124, from the first countershaft 28 to transfer gear 110, from transfer gear 110 to output transfer gear 114a and from output transfer gear 114a to differential housing 19 through transfer shaft 114b.

To establish a fifth forward torque ratio (i.e. a 5th gear), clutch element 36 is engaged to couple the input shaft member 12 to the first transmission input shaft 22 which rotates gear 92 and synchronizer 128 is activated to couple gear 94 to the first countershaft 28. Thus, input torque from the input shaft member 12 is transferred through the dual clutch assembly 32 to the first transmission input shaft 22 to gear 92. Gear 92 transfers torque to gear 94 which transfers the torque to the first countershaft 28 through synchronizer 128, from the first countershaft 28 to transfer gear 110, from transfer gear 110 to output transfer gear 114a and from output transfer gear 114a to differential housing 19 through transfer shaft 114b.

To establish a sixth forward torque ratio (i.e. a 6th gear), clutch element 38 is engaged to couple the input shaft member 12 to the second transmission input shaft 24 which rotates gear 52 and synchronizer 120 is activated to couple gear 54 to the first countershaft 28. Thus, input torque from the input shaft member 12 is transferred through the dual clutch assembly 32 to the second transmission input shaft 24 to gear 52. Gear 52 transfers torque to gear 54 which transfers the torque to the first countershaft 28 through synchronizer 120, from the first countershaft 28 to transfer gear 110, from transfer gear 110 to output transfer gear 114a and from output transfer gear 114a to differential housing 19 through transfer shaft 114b.

To establish a seventh forward torque ratio (i.e. a 7th gear), clutch element 36 is engaged to couple the input shaft member 12 to the first transmission input shaft 22 which rotates gear 84 and synchronizer 126 is activated to couple gear 84 to the second countershaft 30. Thus, input torque from the input shaft member 12 is transferred through the dual clutch assembly 32 to the first transmission input shaft 22 to gear 82. Gear 82 transfers torque to gear 84 which transfers the torque to the second countershaft 30 through synchronizer 126, from the second countershaft 30 to transfer gear 112, from transfer gear 112 to output transfer gear 114a and from output transfer gear 114a to differential housing 19 through transfer shaft 114b.

To establish a eighth forward torque ratio (i.e. a 8th gear), clutch element 38 is engaged to couple the input shaft member 12 to the second transmission input shaft 24 which rotates gear 72 and synchronizer 122 is activated to couple gear 72 to the second countershaft 30. Thus, input torque from the input shaft member 12 is transferred through the dual clutch assembly 32 to the second transmission input shaft 24 to gear 72. Gear 72 transfers torque to gear 74 which transfers the torque to the second countershaft 30 through synchronizer 122, from the second countershaft 30 to transfer gear 112, from transfer gear 112 to output transfer gear 114a and from output transfer gear 114a to differential housing 19 through transfer shaft 114b.

The present invention contemplates that a variety of torque ratios (i.e., the ratio of torque of the output member 14 to the input shaft member 12) are achievable through the selection of tooth counts of the gears of the transmission 10. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

The following is claimed:

1. A transmission comprising:
a transmission housing;
a dual clutch assembly having a clutch housing connectable to a flywheel of an engine, wherein the clutch housing is rotationally supported within the transmission housing;
a first, second, third, fourth, fifth, sixth, and seventh gear sets, wherein each of the gear sets include a first gear in mesh with a second gear and wherein the first gear set includes a third gear in mesh with the second gear and the sixth gear set includes a third gear in mesh with the first gear;
a first transmission input shaft member rotatably supported in the transmission housing and wherein the first gears of the fifth, sixth and seventh gear sets are rotatably fixed for common rotation with the first transmission input shaft member;
a second transmission input shaft member rotatably supported in the transmission housing, wherein the first gears of the first, second, third, and fourth gear sets are rotatably fixed for common rotation with the second transmission input shaft member and wherein the second transmission input shaft member is concentric with the first transmission input shaft member and at least partially surrounds the first transmission input shaft member;
a first countershaft rotatably supported within the transmission housing and spaced apart from and parallel with the first and second transmission input shaft members, wherein each of the second gears of the first, second, third, sixth and seventh gear sets are selectively connectable for common rotation with the first countershaft;
a second countershaft rotatably supported within the transmission housing and spaced apart from and parallel with the first and second transmission input shaft members, wherein each of the second gears of the fourth and fifth gear sets and the third gears of the first and sixth gear sets are selectively connectable for common rotation with the second countershaft; and
five synchronizer assemblies each for selectively coupling at least one of the gears of the first, second, third, fourth, fifth, sixth and seventh gear sets with at least one of the first countershaft and the second countershaft, and
wherein the selective engagement of the dual clutch assembly interconnects the dual clutch housing with at least one of the first and the second transmission input shaft members and the selective engagement of at least one of the five synchronizer assemblies establishes at least one of eight forward speed ratios and at least one reverse speed ratio.

2. The transmission of claim 1 wherein a first of the five synchronizer assemblies selectively connects the second gear of the first gear set to the first countershaft and the second gear of the second gear set to the first countershaft.

3. The transmission of claim 2 wherein a second of the five synchronizer assemblies selectively connects the third gear of the first gear set to the second countershaft and the second gear of the fourth gear set to the second countershaft.

4. The transmission of claim 3 wherein a third of the five synchronizer assemblies selectively connects the second gear of the third gear set to the first countershaft.

5. The transmission of claim 4 wherein a fourth of the five synchronizer assemblies selectively connects the second gear of the fifth gear set to the second countershaft and the third gear of the sixth gear set to the second countershaft.

6. The transmission of claim 5 wherein a fifth of the five synchronizer assemblies selectively connects the second gear of the sixth gear set to the first countershaft and the second gear of the seventh gear set to the first countershaft.

7. The transmission of claim 1 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, and the seventh gear set is between an end wall of the transmission housing and the sixth gear set.

8. The transmission of claim 7 wherein the first gear set provides a second forward speed ratio and a reverse speed ratio, the second gear set provides a sixth forward speed ratio, the third gear set provides a fourth speed ratio, the fourth gear set provides an eighth forward speed ratio, the fifth gear set provides a seventh forward speed ratio, the sixth gear set provides a third and a fifth forward speed ratios, and the seventh gear set provides a first forward speed ratio.

9. The transmission of claim 8 further including a first transfer gear, second transfer gear and an output gear, wherein the first transfer gear is rotatably fixed to the first countershaft, the second transfer gear is rotatably fixed to the second countershaft and each of the first and second transfer gears is in mesh with the output gear.

10. A transmission comprising:
a transmission housing;
a dual clutch assembly having a clutch housing connectable to a flywheel of an engine, wherein the clutch housing is rotationally supported within the transmission housing;
a first, second, third, fourth, fifth, sixth, and seventh gear sets, wherein each of the gear sets include a first gear in mesh with a second gear and wherein the first gear set includes a third gear in mesh with the second gear and the sixth gear set includes a third gear in mesh with the first gear;
a first transmission input shaft rotatably supported in the transmission housing and wherein the first gears of the fifth, sixth and seventh gear sets are rotatably fixed for common rotation with the first transmission input shaft;
a second transmission input shaft rotatably supported in the transmission housing, wherein the first gears of the first, second, third, and fourth gear sets are rotatably fixed for common rotation with the second transmission input shaft and wherein the second transmission input shaft is concentric with the first transmission input shaft and at least partially surrounds the first transmission input shaft;
a first countershaft rotatably supported within the transmission housing and spaced apart from and parallel with the first and second transmission input shafts, wherein each of the second gears of the first, second, third, sixth and seventh gear sets are selectively connectable for common rotation with the first countershaft;
a first transfer gear fixedly connected for common rotation with the first countershaft;
a second countershaft rotatably supported within the transmission housing and spaced apart from and parallel with the first and second transmission input shafts, wherein each of the second gears of the fourth and fifth gear sets and the third gears of the first and sixth gear sets are selectively connectable for common rotation with the second countershaft;
a second transfer gear fixedly connected for common rotation with the second countershaft;
an output gear support for rotation in the transmission housing wherein the first and second transfer gears each independently mesh with the output gear; and
five synchronizer assemblies each for selectively coupling at least one of the gears of the first, second, third, fourth, fifth, sixth and seventh gear sets with at least one of the first countershaft and the second countershaft, and
wherein the selective engagement of the dual clutch assembly interconnects the dual clutch housing with at least one of the first and the second transmission input shafts and the selective engagement of at least one of the five synchronizer assemblies transfers torque from at least one of the first and the second transmission input shafts to the output gear through at least one of the first and second transfer gears to achieve at least one of eight forward speed ratios and at least one reverse speed ratio.

11. The transmission of claim 10 wherein a first of the five synchronizer assemblies selectively connects the second gear of the first gear set to the first countershaft and the second gear of the second gear set to the first countershaft.

12. The transmission of claim 11 wherein a second of the five synchronizer assemblies selectively connects the third gear of the first gear set to the second countershaft and the second gear of the fourth gear set to the second countershaft.

13. The transmission of claim 12 wherein a third of the five synchronizer assemblies selectively connects the second gear of the third gear set to the first countershaft.

14. The transmission of claim 13 wherein a fourth of the five synchronizer assemblies selectively connects the second gear of the fifth gear set to the second countershaft and the third gear of the sixth gear set to the second countershaft.

15. The transmission of claim 14 wherein a fifth of the five synchronizer assemblies selectively connects the second gear of the sixth gear set to the first countershaft and the second gear of the seventh gear set to the first countershaft.

16. The transmission of claim 15 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, and the seventh gear set is disposed between an end wall of the transmission housing and the sixth gear set.

17. The transmission of claim 16 wherein the first gear set provides a second forward speed ratio and a reverse speed ratio, the second gear set provides a sixth forward speed ratio, the third gear set provides a fourth speed ratio, the fourth gear set provides an eighth forward speed ratio, the fifth gear set provides a seventh forward speed ratio, the sixth gear set provides a third and a fifth forward speed ratios, and the seventh gear set provides a first forward speed ratio.

* * * * *